(12) United States Patent
Nakamura et al.

(10) Patent No.: US 8,570,436 B2
(45) Date of Patent: Oct. 29, 2013

(54) INFORMATION PROCESSING DEVICE, INFORMATION PROCESSING METHOD, AND PROGRAM

(75) Inventors: Sensaburo Nakamura, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 13/336,468

(22) Filed: Dec. 23, 2011

(65) Prior Publication Data

US 2012/0176537 A1      Jul. 12, 2012

(30) Foreign Application Priority Data

Jan. 6, 2011    (JP) ................................ P2011-000953

(51) Int. Cl.
*H04N 7/01*      (2006.01)
*H04N 11/20*    (2006.01)

(52) U.S. Cl.
USPC ............................ 348/459; 386/278; 386/351

(58) Field of Classification Search
USPC ........... 348/441–459; 386/278, 279, 351, 343
See application file for complete search history.

(56) References Cited

U.S. PATENT DOCUMENTS

| 7,623,756 B2 | 11/2009 | Komori et al. | |
| 7,782,396 B2 * | 8/2010 | Haneda | 348/443 |
| 2008/0007653 A1 * | 1/2008 | Mori et al. | 348/462 |
| 2009/0161011 A1 * | 6/2009 | Hurwitz et al. | 348/459 |

FOREIGN PATENT DOCUMENTS

JP      2006-54746      2/2006

* cited by examiner

*Primary Examiner* — Michael Lee
(74) *Attorney, Agent, or Firm* — Frommer Lawrence & Haug LLP; William S. Frommer (57) ABSTRACT

An information processing device includes an input unit configured to input video data, a setting unit configured to set a progressing speed of the video data that is inputted, an interpolation processing unit configured to perform interpolation processing corresponding to the progressing speed that is set, with respect to the video data that is inputted, and an imparting unit configured to impart a time code to all frames constituting interpolated video data that is obtained as a result of the interpolation processing.

10 Claims, 8 Drawing Sheets

| FRAME NUMBER | TIME CODE |
|---|---|
| 0 | 01:00:00:00 |
| 1 | 01:00:00:01 |
| 2 | 01:00:00:02 |
| 3 | 01:00:00:03 |
| 4 | 01:00:00:04 |
| 5 | 01:00:00:05 |
| 6 | 01:00:00:06 |

STOP TC

INFORMATION PROCESSING DEVICE, INFORMATION PROCESSING METHOD, AND PROGRAM

BACKGROUND

The present technology relates to an information processing device, an information processing method, and a program. Especially, the present technology relates to an information processing device, an information processing method, and a program that are favorably used in a case where a progressing speed of video data is changed.

To each frame of video data taken by a video camera, for example, a number referred to as a time code which is positional information on a temporal axis is imparted (For example, refer to Japanese Unexamined Patent Application Publication No. 2006-54746). A number is similarly imparted to animation video data obtained by computer graphics (CG).

In a case where such video data is reproduced at a speed slower than a standard speed and outputted at a frame rate same as that in standard speed reproduction (for example, 30 frames/sec.), it is necessary to generate an interpolation frame which does not exist in original video data by interpolation using a frame constituting the video data. In this specification, reproduction represents that a video image of a frame based on video data is progressed in a time-series fashion (playback).

Concretely, in a case of reproduction at ⅓ multiple speed, for example, two interpolation frames are generated and inserted between successive frames of the original video data. However, in a case where an interpolation frame is generated in slow reproduction, a time code is not imparted to the interpolation frame which is generated.

SUMMARY

Thus, a time code is not imparted to an interpolation frame which is generated in slow reproduction, so that an arbitrary interpolation frame is not specified by a time code.

Therefore, even if slow reproduction is stopped at timing when an interpolation frame is displayed, for example, the slow reproduction is not resumed from this interpolation frame but the slow reproduction is resumed from a frame, which is close to the interpolation frame and has a time code, of original video data, bringing a feeling of strangeness.

Further, in a case where a reproduction position of video data is tried to be moved (cue up), for example, an interpolation frame is not specified as a moving destination.

It is desirable to enable specifying an arbitrary temporal position on interpolated video data by using a time code.

An information processing device according to an embodiment of the present technology includes an input unit configured to input video data, a setting unit configured to set a progressing speed of the video data that is inputted, an interpolation processing unit configured to perform interpolation processing corresponding to the progressing speed that is set, with respect to the video data that is inputted, and an imparting unit configured to impart a time code to all frames constituting interpolated video data that is obtained as a result of the interpolation processing.

The information processing device according to another embodiment of the present technology may further include a managing unit configured to manage the interpolated video data to which the time code is imparted and the progressing speed, in a manner to associate the interpolated video data and the progressing speed with each other, and a reproduction unit configured to perform variable speed reproduction of the interpolated video data that is managed by the managing unit at an arbitrary speed that is specified by a user.

The reproduction unit, further, may move an output position to a position on the interpolated video data which is specified by using the time code that is imparted.

The information processing device according to still another embodiment of the present technology may further include a display control unit configured to display a video image of the interpolated video data that is subject to the variable speed reproduction.

The display control unit may display the time code that is imparted as well in synchronization with a video image of each of the frames of the interpolated video data that is subject to the variable speed reproduction.

The information processing device according to yet another embodiment of the present technology may further include a time code table generating unit configured to generate a time code table that shows association between a frame number of each of the frames of the interpolated video data and the time code that is imparted to each of the frames, and the managing unit may manage the interpolated video data to which the time code is imparted and the time code table in a manner to associate the interpolated video data and the time code table with each other.

The input unit may input one of the video data that is imaged and the video data that is obtained by CG.

The setting unit may set the progressing speed based on a speed setting value that is specified by a user or sets the progressing speed based on an input time length of the video data and an output time length of the interpolated Video data that is specified by the user.

According to yet another embodiment of the present technology, there is provided an information processing method of an information processing device performing a process including inputting video data, setting a progressing speed of the video data that is inputted, performing interpolation processing corresponding to the progressing speed that is set, with respect to the video data that is inputted, and imparting a time code to all frames constituting interpolated video data that is obtained as a result of the interpolation processing.

According to yet another embodiment of the present technology, there is provided a program for controlling an information processing device and making a computer of the information processing device execute processing including inputting video data, setting a progressing speed of the video data that is inputted, performing interpolation processing corresponding to the progressing speed that is set, with respect to the video data that is inputted, and imparting a time code to all frames constituting interpolated video data that is obtained as a result of the interpolation processing.

According to the embodiments of the present technology, interpolation processing corresponding to a progressing speed which is set is performed with respect to inputted video data and a time code is imparted to all frames constituting interpolated video data which is obtained as a result of the interpolation processing.

According to the embodiments of the present technology, an arbitrary temporal position on the interpolated video data can be specified by using a time code.

DETAILED DESCRIPTION OF EMBODIMENTS

A preferred embodiment (referred to below as an embodiment) of the present technology is now described in detail with reference to the accompanying drawings.

<1. Embodiment>

[Configuration Example of Image Editing Device]

Figure 1:
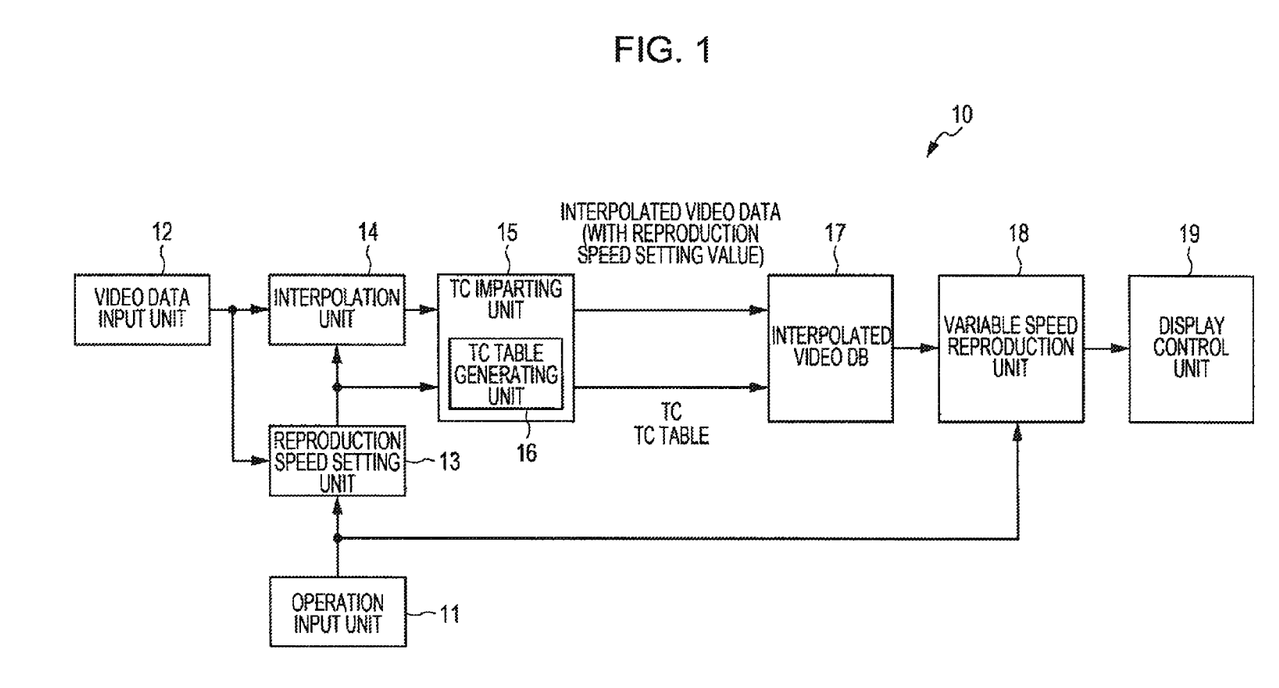
FIG. 1 is a block diagram showing a configuration example of an image editing device according to an embodiment of the present technology.

FIG. 1 illustrates a configuration example of an image editing device according to an embodiment of the present technology. This image editing device 10 reproduces video data at a speed slower than a standard speed and generates interpolated video data having a frame rate same as that in standard speed reproduction (for example, 30 frames/sec.). A time code is imparted to all frames of interpolated video data.

The image editing device 10 includes an operation input unit 11, a video data input unit 12, a reproduction speed setting unit 13, an interpolation unit 14, a time code (TC) imparting unit 15, an interpolated video database (DB) 17, a variable speed reproduction unit 18, and a display control unit 19.

The operation input unit 11 accepts various operations performed by a user. Specifically, the operation input unit 11 accepts an input of a reproduction speed setting value N which is used for specifying a reproduction speed of video data, for example, and outputs the reproduction speed setting value N to the reproduction speed setting unit 13. Here, N is a positive value which is 1 or more. If N is limited to a positive integer equal to or more than 1, a load on interpolation processing in the interpolation unit 14 can be reduced. Further, instead of inputting the reproduction speed setting value N, a reproduction time length in slow reproduction (referred to below as an output time length) may be specified.

Further, for example, the operation input unit 11 accepts an input of a reproduction speed in variable speed reproduction of interpolated video data and accepts an input of a time code for instructing a moving destination for cue up (movement of a reproduction position) on interpolated video data so as to output the input to the variable speed reproduction unit 18.

The video data input unit 12 acquires video data which is a processing object of the image editing device 10 from outside so as to output the video data to the interpolation unit 14.

Here, the video data may be a video image taken by a video camera or an image produced by CG.

Further, CG data containing geometric information (shading information in an option) may be inputted, and the video data input unit 12 may interpolate between key frames of the CG data and perform rendering so as to generate a video image.

The video data input unit 12 detects a reproduction time length of video data, which is a processing object, in standard speed reproduction (referred to below as an input time length) and outputs the reproduction time length to the reproduction speed setting unit 13.

The reproduction speed setting unit 13 determines the reproduction speed of the video data as 1/N based on the reproduction speed setting value N which is inputted from the operation input unit 11 and notifies the reproduction speed to the interpolation unit 14 and the time code imparting unit 15. Further, when an output time length is inputted from the operation input unit 11, the reproduction speed setting unit 13 determines the reproduction speed of the video data as (input time length/output time length) so as to notify the reproduction speed to the interpolation unit 14 and the time code imparting unit 15. For example, when the input time length is one minute and the output time length is two minutes, the reproduction speed is determined as ½.

The interpolation unit 14 generates an interpolation frame by interpolation processing using an original frame which constitutes the video data, in accordance with the reproduction speed notified by the reproduction speed setting unit 13, so as to generate interpolated video data. When the number of frames of the video data is set to $F_0$, the number of frames $F_m$ of the interpolated video data is expressed as $F_m=(F_0-1) \times N+1$. When this calculation result includes a value of the fraction part, rounding processing such as rounding up, rounding down, and rounding off is performed. In the following embodiment, rounding up is employed. ROUNDUP(x) represents a value obtained by rounding up x.

Further, the interpolation unit 14 sequentially outputs each frame (the original frame constituting the video data and the interpolation frame) of the interpolated video data to the time code imparting unit 15.

The time code imparting unit 15 imparts a time code (HH:MM:SS:FF) to all frames of the interpolated video data which are sequentially inputted from the interpolation unit 14.

Figure 2:
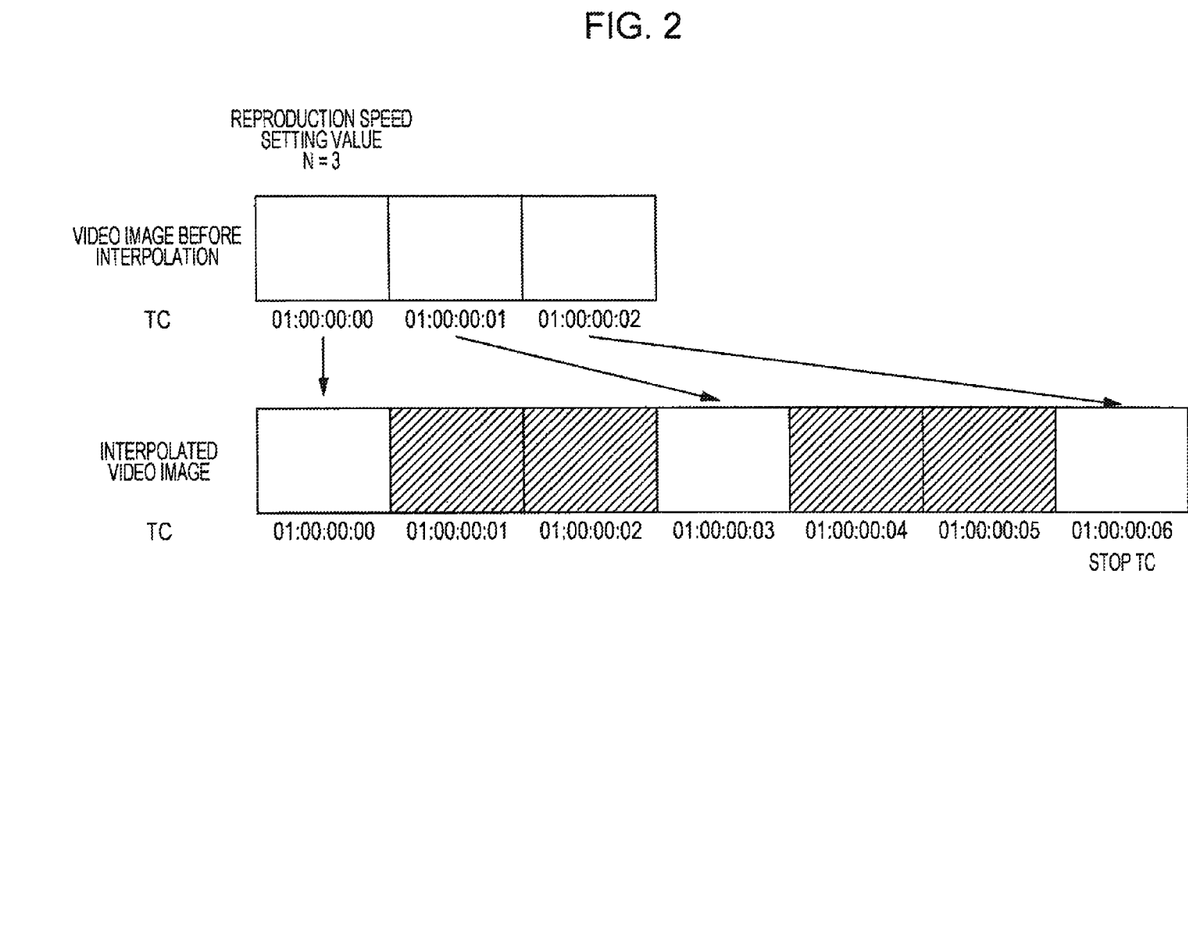
FIG. 2 illustrates interpolation frames and time codes of interpolated video data in reproducing at 1/3 multiple speed when the number of frames of video data is 3.

For example, when the number of frames $F_0$ of the video data is expressed as $F_0=3$ and the reproduction speed is set to 1/3, the number of frames $F_m$ of the interpolated video data is expressed as $F_m=(3-1) \times 3+1=7$. Then, as shown in FIG. 2, two interpolation frames (frames represented by diagonal lines in FIG. 2) are generated between a first frame (time code=01:00:00:00) and a second frame (time code=01:00:00:01) which are original frames of the video data. In a similar manner, two interpolation frames are generated between the second frame (time code=01:00:00:01) and a third frame (time code=01:00:00:02) which are original frames of the video data. Then, time codes 01:00:00:00 to 01:00:00:06 are newly imparted to respective frames of the interpolated video data.

Figure 3:
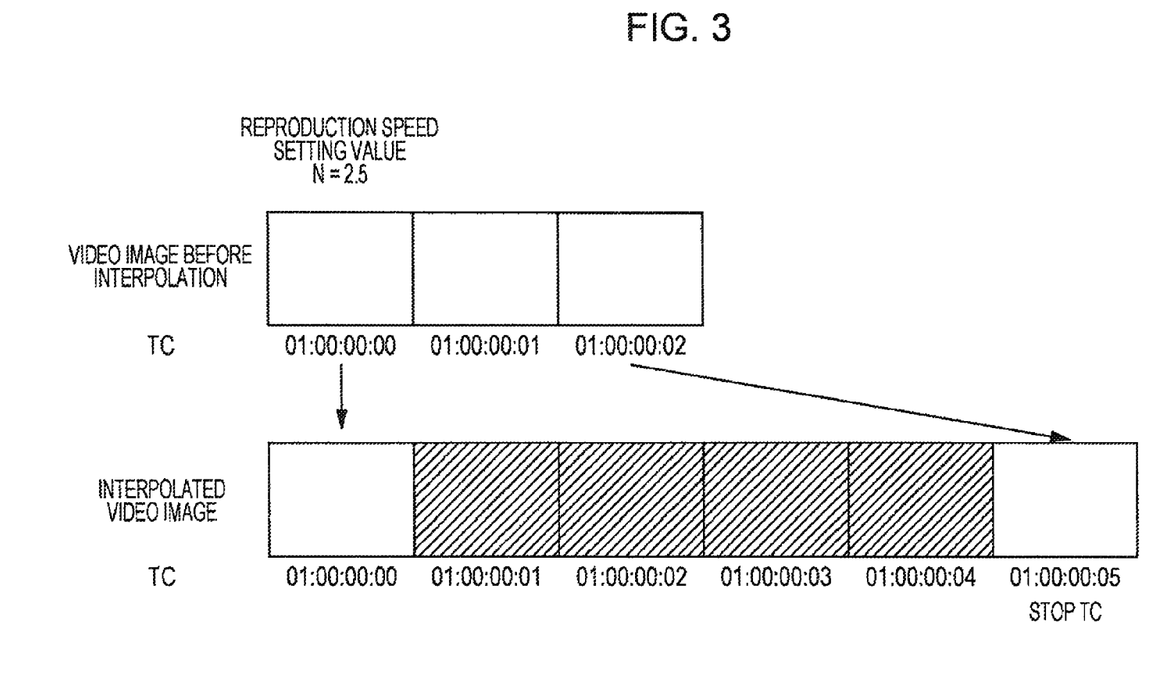
FIG. 3 illustrates interpolation frames and time codes of interpolated video data in reproducing at 1/2.5 multiple speed when the number of frames of video data is 3.

For example, when the number of frames $F_0$ of the video data is expressed as $F_0=3$ and the reproduction speed is set to 1/2.5, the number of frames $F_m$ of the interpolated video data is expressed as $F_m=(3-1) \times 2.5+1=6$. Then, as shown in FIG. 3, four interpolation frames (frames represented by diagonal lines in FIG. 3) are generated between the first frame (time code=01:00:00:00) and the third frame (time code=01:00:00:02) which are the original frames of the video data. Here, the second frame which is the original frame of the video data is used in the interpolation processing, but the second frame is not included in the interpolated video data. Then, time codes 01:00:00:00 to 01:00:00:05 are newly imparted to respective frames of the interpolated video data.

Figure 4:
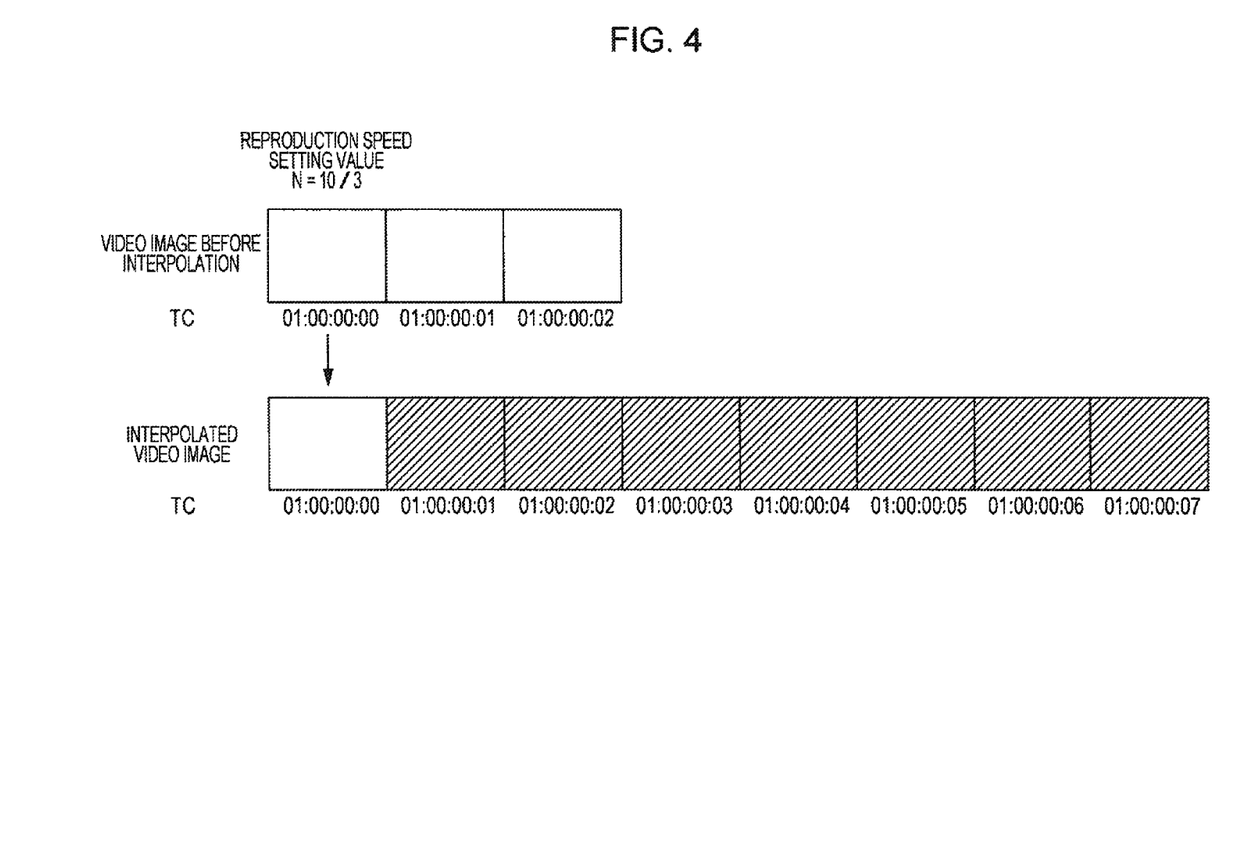
FIG. 4 illustrates interpolation frames and time codes of interpolated video data in reproducing at 1/3.3 multiple speed when the number of frames of video data is 3.

For example, when the number of frames $F_0$ of the video data is expressed as $F_0=3$ and the reproduction speed is set to 1/(10/3), the number of frames $F_m$ of the interpolated video data is expressed as $F_m=\text{ROUNDUP}((3-1)\times(10/3)+1)=8$. Then, as shown in FIG. 4, seven interpolation frames (frames represented by diagonal lines in FIG. 4) are generated after the first frame (time code=01:00:00:00) which is the original frame of the video data. Here, the second and third frames which are the original frames of the video data are used in the interpolation processing, but the second and third frames are not included in the interpolated video data. Then, time codes 01:00:00:00 to 01:00:00:07 are newly imparted to respective frames of the interpolated video data.

Figure 5:
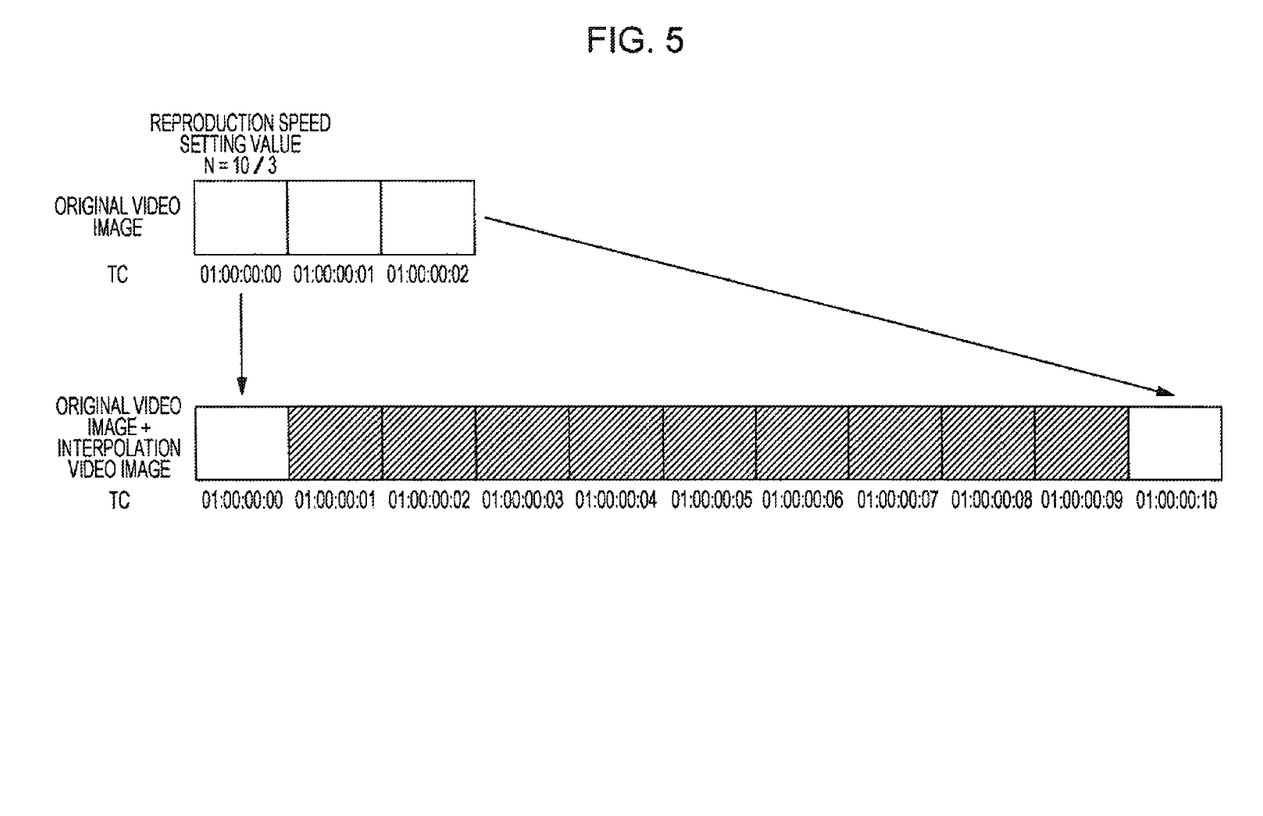
FIG. 5 illustrates interpolation frames and time codes of interpolated video data in reproducing at 1/3.3 multiple speed when the number of frames of video data is 4.

For example, when the number of frames $F_0$ of the video data is expressed as $F_0=4$ and the reproduction speed is set to 1/(10/3), the number of frames $F_m$ of the interpolated video data is expressed as $F_m=(4-1)\times(10/3)+1=11$. Then, as shown in FIG. 5, nine interpolation frames (frames represented by diagonal lines in FIG. 5) are generated between the first frame (time code=01:00:00:00) and a fourth frame (time code=01:00:00:03) which are original frames of the video data. Here, the second and third frames which are the original frames of the video data are used in the interpolation processing, but the second and third frames are not included in the interpolated video data. Then, time codes 01:00:00:00 to 01:00:00:10 are newly imparted to respective frames of the interpolated video data.

Referring back to FIG. 1, the time code imparting unit 15 synchronizes the interpolated video data which is sequentially inputted from the interpolation unit 14 and the time codes and outputs the interpolated video data and the time codes to the interpolated video database 17.

Figure 6:
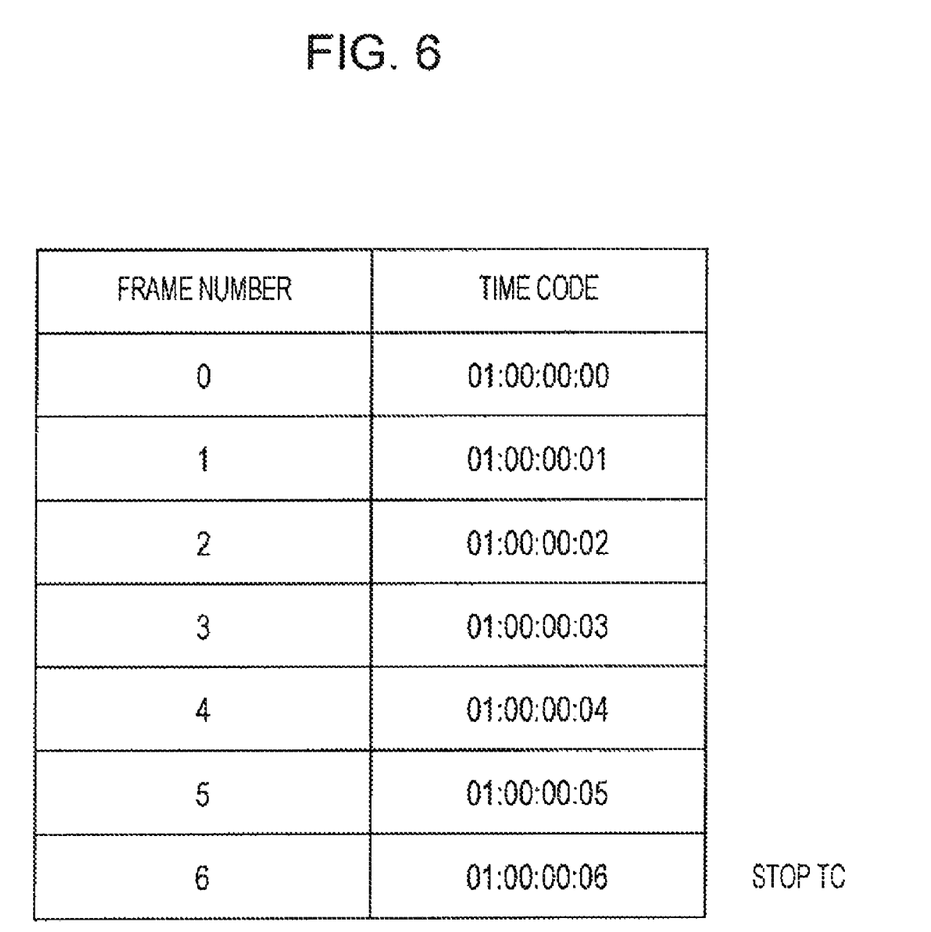
FIG. 6 illustrates one example of a time code table.

A time code (TC) table generating unit 16 included in the time code imparting unit 15 generates a time code table in which time codes are associated with frame numbers of respective frames of the interpolated video data as shown in FIG. 6 and outputs the time code table to the interpolated video database 17.

The interpolated video database 17 associates the interpolated video data and the time codes which are inputted in a synchronized manner, and the time code table with the reproduction speed setting value N and stores the interpolated video data, the time code, and the time code table. For example, when identical video data is reproduced more than once at different reproduction speeds, combinations of interpolated video data and time codes of which the number is same as the reproduction number, and a time code table are stored. Among frames of the interpolated video data, frames constituting the original video data may be stored in a manner to correspond to original time codes which are imparted before the interpolation processing.

The variable speed reproduction unit 18 reproduces the interpolated video data which is stored in the interpolated video database 17 at a reproduction speed (set to M multiple speed) which is instructed by a user, in accordance with user's operation inputted into the operation input unit 11 and outputs the interpolated video data to the display control unit 19. In this case, the original data is reproduced at M/N multiple speed substantively. For example, when the interpolated video data corresponding to the reproduction speed setting value N=3 is reproduced at a standard speed, the original video data is reproduced at ⅓ multiple speed substantively. For example, when the interpolated video data corresponding to the reproduction speed setting value N=3 is reproduced at a triple speed, the original data is reproduced at a standard (1=3/3) speed substantively.

The variable speed reproduction unit 18 executes cue up of the interpolated video data which is stored in the interpolated video database 17 (the variable speed reproduction unit 18 moves a temporal position) in accordance with user's operation inputted into the operation input unit 11.

Further, the variable speed reproduction unit 18 outputs a reproduced video image and a time code (which is imparted after the interpolation processing) and a stop time code which correspond to the video image to the display control unit 19. Here, a time code which is originally imparted before the interpolation processing may be outputted to the display control unit 19.

The display control unit 19 displays the video image of the interpolated video data which is reproduced by the variable speed reproduction unit 18 on a display (not shown) of the subsequent stage, for example. The display control unit 19 displays the reproduced video image of the interpolated video data, and a time code and a stop time code which synchronize with the video image.

[Description of Operation]

Figure 7:
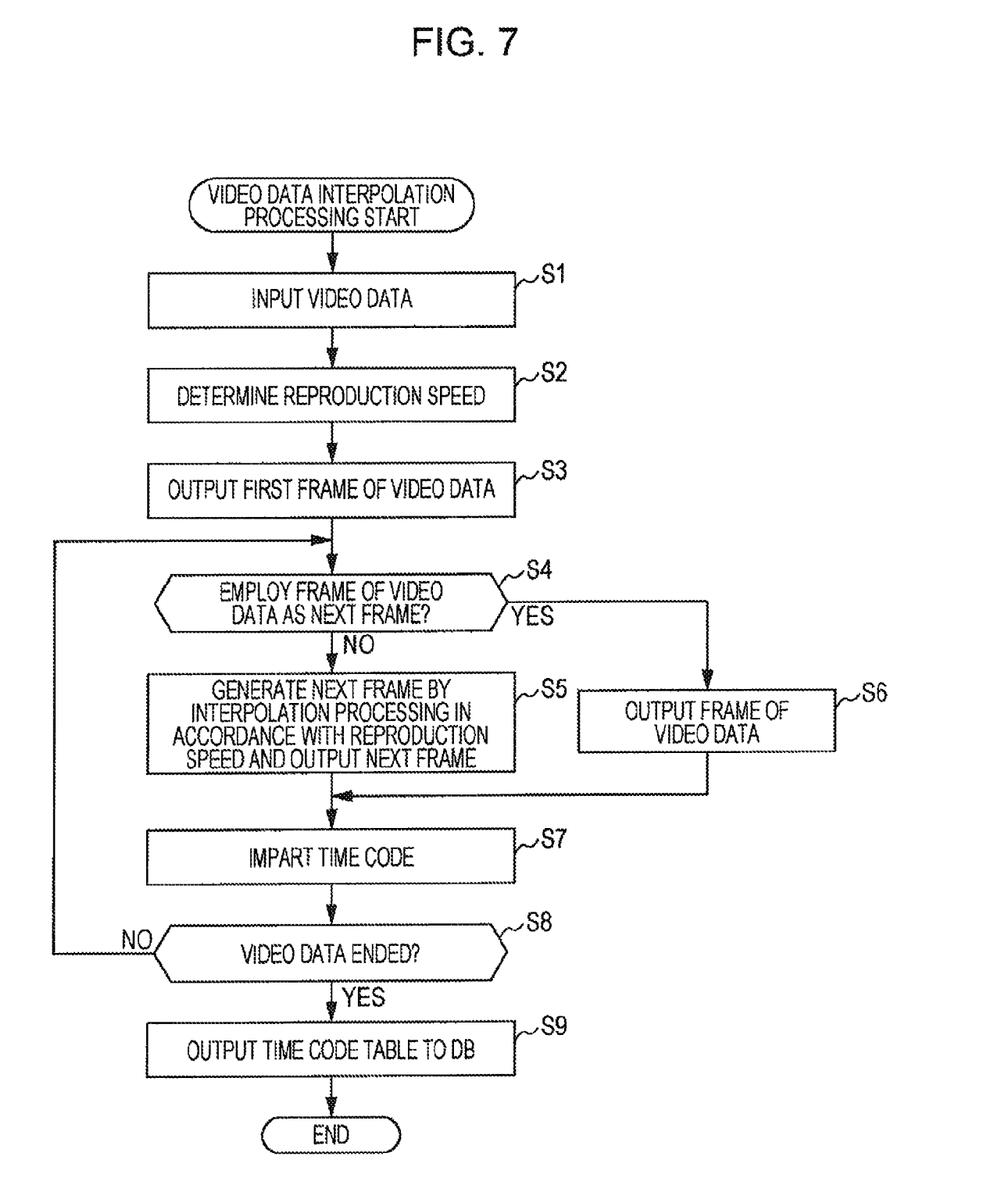
FIG. 7 is a flowchart of video data interpolation processing.

An operation of the image editing device 10 is now described. FIG. 7 is a flowchart of video data interpolation processing performed by the image editing device 10.

Before the start of the video data interpolation processing, it is assumed that video data which is a processing object and the reproduction speed setting value N is specified by a user.

In step S1, the video data input unit 12 acquires video data which is the processing object from outside and outputs the video data to the interpolation unit 14.

In step S2, the reproduction speed setting unit 13 determines a reproduction speed of the video data as 1/N based on the reproduction speed setting value N which is specified by the user and notifies the reproduction speed to the interpolation unit 14 and the time code imparting unit 15.

In step S3, the interpolation unit 14 outputs a first frame of the video data to the time code imparting unit 15. The time code imparting unit 15 imparts time code 01:00:00:00 to the first frame and outputs the first frame and the time code to the interpolated video database 17.

In step S4, the interpolation unit 14 determines whether a next outputted frame is an original frame of the video data or not, in other words, whether the next outputted frame is an interpolation frame or not.

When it is determined that the next outputted frame is not the original frame of the video data (the next outputted frame is an interpolation frame), the processing goes to step S5. In step S5, the interpolation unit 14 generates an interpolation frame by interpolation processing using the original frame of the video data in accordance with the reproduction speed notified from the reproduction speed setting unit 13 and outputs the interpolation frame to the time code imparting unit 15.

On the other hand, when it is determined that the next outputted frame is the original frame of the video data (the next outputted frame is not an interpolation frame), the processing goes to step S6. In step S6, the interpolation unit 14 outputs the original frame of the video data to the time code imparting unit 15.

In step S7, the time code imparting unit 15 imparts a time code to the frame inputted from the interpolation unit 14 and outputs the frame and the time code to the interpolated video database 17 in a manner to synchronize the frame and the time code with each other. The interpolated video database 17 stores the frame of the interpolated video data and the time code, which are inputted in the synchronized fashion, in a manner to associate the frame and the time code with the reproduction speed setting value N.

In step S8, the interpolation unit 14 determines whether the interpolation processing of the video data which is the processing object is ended or not, and repeats the processing from step S4 to step S8 until the interpolation unit 14 determines that the interpolation processing is ended. When it is determined that the interpolation processing is ended in step S8, the processing goes to step S9.

In step S9, the time code table generating unit 16 of the time code imparting unit 15 generates a time code table in which time codes are associated with frame numbers of respective frames of the interpolated video data and outputs the time code table to the interpolated video database 17. The interpolated video database 17 stores the time code table which is inputted, in a manner to associate the time code table with interpolated video data and time codes which are preliminarily managed. Thus, the video data interpolation processing is ended.

According to the video data interpolation processing described above, interpolated video data having a frame rate same as that in standard speed reproduction (for example, 30 frames/sec.) can be generated when video data is reproduced at a speed slower than a standard speed. Since time codes are imparted to all frames of this interpolated image data, a temporal position on the interpolated image data can be specified by using the time code.

The image editing device 10 of the embodiment of the present technology can be used in locations of video production agencies, broadcast stations, and the like in which video images are processed and edited.

Though it is assumed that the progressing speed of a video image is slower than the standard speed in this embodiment, the image editing device 10 is applicable for the progressing speed equal to or higher than the standard speed. Interpolation processing in this case includes thinning processing.

By the way, the series of the processing described above may be performed either by hardware or software. In a case where the series of processing is performed by software, a program constituting the software is installed from a program storage medium into a computer incorporated in dedicated hardware or into a general-purpose computer, for example, which is capable of performing various functions when various programs are installed.

Figure 8:
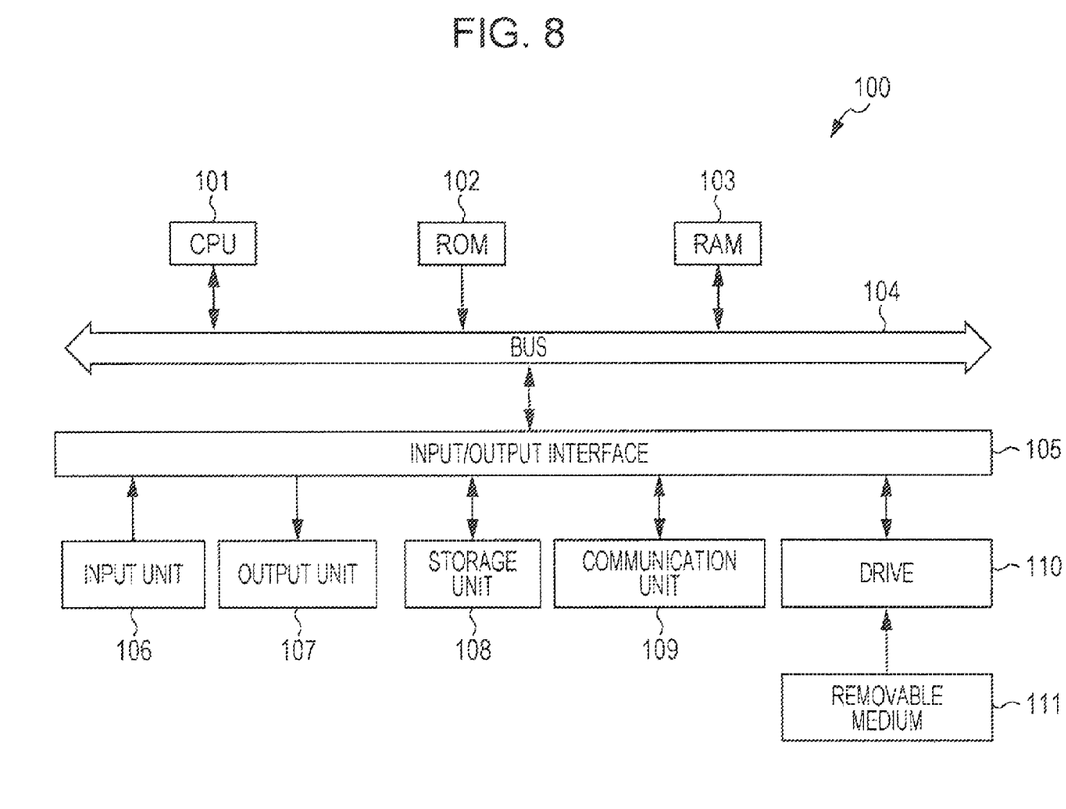
FIG. 8 is a block diagram showing a configuration example of a computer.

FIG. 8 is a block diagram showing a configuration example of hardware of a computer which executes the above-described series of processing by a program.

In this computer 100, a central processing unit (CPU) 101, a read only memory (ROM) 102, and a random access memory (RAM) 103 are connected with each other by a bus 104.

To the bus 104, an input/output interface 105 is further connected. To the input/output interface 105, an input unit 106, an output unit 107, a storage unit 108, a communication unit 109, and a drive 110 are connected. The input unit 106 is composed of a keyboard, a mouse, a microphone, and the like. The output unit 107 is composed of a display, a speaker, and the like. The storage unit 108 is composed of hard disk, a nonvolatile memory, and the like. The communication unit 109 is composed of a network interface and the like. The drive 110 drives a removable medium 111 which is a magnetic disc, an optical disc, a magnetic-optical disc, or a semiconductor memory.

In the computer 100 configured as above, the CPU 101 loads a program stored in the storage unit 108, for example, on the RAM 103 via the input/output interface 105 and the bus 104 and executes the program. Thus, the above-described series of processing is performed.

Here, the program executed by the computer may be a program by which the processing is performed in a time series manner along with the order which is described in this specification or a program by which the processing is performed in a parallel manner or at necessary timing such as when calling is performed.

Further, the program may be processed by a single computer or may be processed in a distributed manner by a plurality of computers. Further, the program may be transferred to a remote computer and be performed.

It should be understood that embodiments of the present technology are not limited to the embodiment described above and various alterations may occur within the scope of the present technology.

The present disclosure contains subject matter related to that disclosed in Japanese Priority Patent Application JP 2011-000953 filed in the Japan Patent Office on Jan. 6, 2011, the entire contents of which are hereby incorporated by reference.

What is claimed is:

1. An information processing device, comprising:
an input unit configured to input frames of video data at a settable input speed;
a setting unit configured to set the input speed of the video data that is inputted;
an interpolation processing unit configured to perform interpolation processing on the frames of the input video data corresponding to the input speed that is set so as to provide output video data at an output speed, wherein when $F_0$ frames of video data are input ($F_0$ is an integer), the interpolation processing unit interpolates frames into the video data to produce output video data of $F_m$ frames, where $F_m = (F_0 - 1) \times N + 1$, the $F_m$ frames include interpolated frames, N is the inverse of the output speed of the video data and $F_m$ is rounded up or down; and
an imparting unit configured to impart a time code to all frames including the interpolated frames of video data that is obtained as a result of the interpolation processing.

2. The information processing device according to claim 1, further comprising:
a managing unit configured to manage the interpolated video data to which the time code is imparted and the input speed, thereby associating the interpolated video data and the input speed with each other; and
a reproduction unit configured to perform variable speed reproduction of the interpolated video data that is managed by the managing unit at an arbitrary speed that is specified by a user.

3. The information processing device according to claim 2, wherein the reproduction unit, further, moves an output position to a position on the interpolated video data, the position being specified by using the time code that is imparted.

4. The information processing device according to claim 2, further comprising:
a display control unit configured to display a video image of the interpolated video data that is subject to the variable speed reproduction.

5. The information processing device according to claim 4, wherein the display control unit displays the time code that is imparted in synchronization with a video image of each of the frames of the interpolated video data that is subject to the variable speed reproduction.

6. The information processing device according to claim 2, further comprising:
a time code table generating unit configured to generate a time code table that shows association between a frame number of each of the frames of the interpolated video data and the time code that is imparted to each of the frames; wherein the managing unit manages the interpolated video data to which the time code is imparted and the time code table in a manner to associate the interpolated video data and the time code table with each other.

7. The information processing device according to claim 1, wherein the input unit inputs imaged video data or video data that is obtained by computer graphics.

8. The information processing device according to claim 1, wherein the setting unit sets the input speed based on a speed setting value that is specified by a user or sets the input speed based on an input time length of the video data and an output time length of the interpolated video data, the output time length being specified by the user.

9. An information processing method comprising:

inputting frames of video data at a settable input speed;

setting the input speed of the video data that is inputted;

performing interpolation processing on the frames of the input video data corresponding to the input speed that is set so as to provide output video data at an output speed, wherein when $F_0$ frames of video data are input ($F_0$ is an integer), the interpolation processing interpolates frames into the video data to produce output video data of $F_m$ frames, where $F_m=(F_0-1) \times N+1$, the $F_m$ frames include interpolated frames, N is the inverse of the output speed of the video data and $F_m$ is rounded up or down; and imparting a time code to all frames including the interpolated frames of video data that is obtained as a result of the interpolation processing.

10. A non-transitory computer-readable medium on which is stored a program which, when executed, controls an information processing device to perform the method, comprising:

inputting frames of video data at a settable input speed;

setting the input speed of the video data that is inputted;

performing interpolation processing on the frames of the input video data corresponding to the input speed that is set so as to provide output video data at an output speed, wherein when $F_0$ frames of video data are input ($F_0$ is an integer), the interpolation processing interpolates frames into the video data to produce output video data of $F_m$ frames, where $F_m=(F_0-1) \times N+1$, the $F_m$ frames include interpolated frames, N is the inverse of the output speed of the video data and $F_m$ is rounded up or down; and imparting a time code to all frames including the interpolated frames of video data that is obtained as a result of the interpolation processing.

* * * * *